April 5, 1938.  W. DALTON  2,113,398
FITTING FOR FLUID CIRCULATING SYSTEMS
Filed Dec. 16, 1936
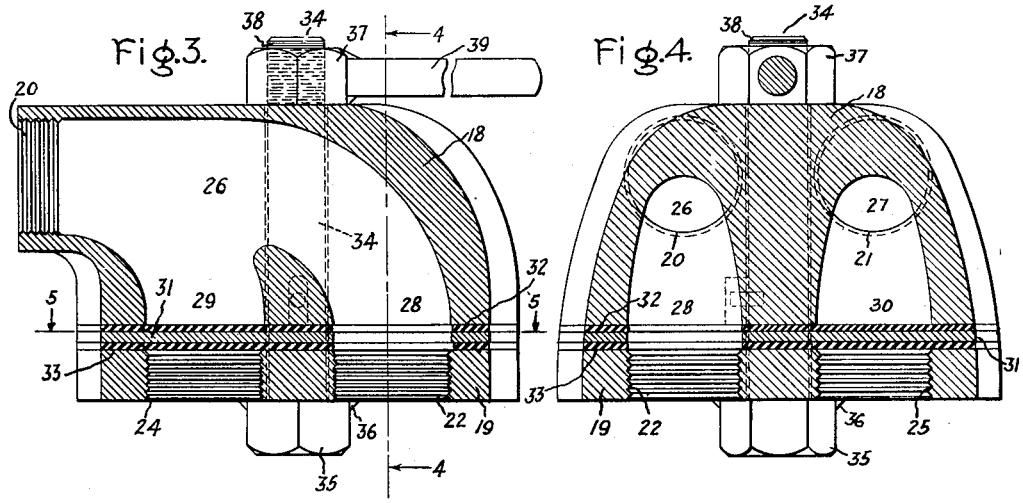
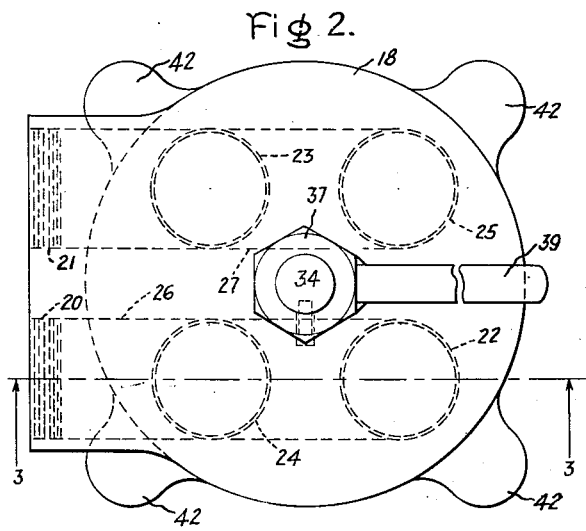
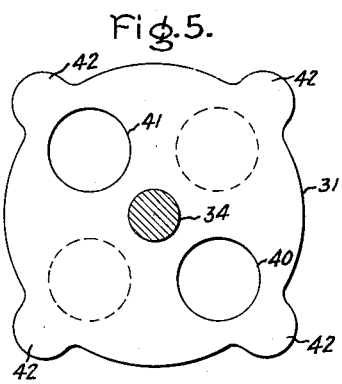
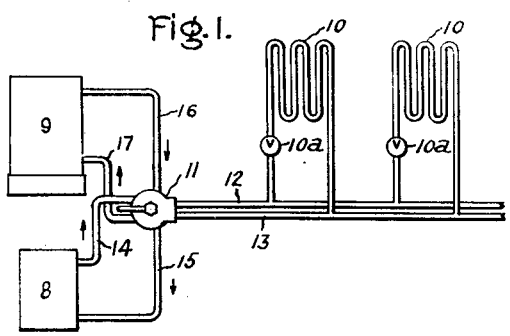
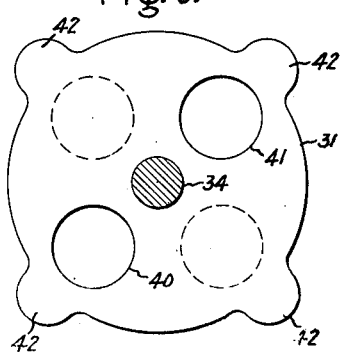
Inventor:
William Dalton,
by Harry E. Dunham
His Attorney.

Patented Apr. 5, 1938

2,113,398

UNITED STATES PATENT OFFICE 2,113,398

FITTING FOR FLUID CIRCULATING SYSTEMS

William Dalton, Schenectady, N. Y., assignor to General Electric Company, a corporation of New York Application December 16, 1936, Serial No. 116,108

4 Claims. (Cl. 251—84)

My invention relates to fittings for fluid circulating or distributing systems and particularly to such fittings arranged to connect a single fluid circuit to any one of a plurality of other circuits.

In fluid circulating or distributing systems, it is frequently desired to provide an arrangement whereby one circuit of the system may be connected to any one of a plurality of circuits to vary the operation of the system; for example, in a house heating and cooling system it is often desirable to use a single group of radiators or heat exchange elements for both heating and cooling. It is, therefore, necessary to provide a valve arrangement so that the radiators may be connected either to a source of heating fluid or to a source of cooling fluid. A six-way valve may be employed to accomplish this purpose, but a valve requires easily movable parts and is difficult to seal against leakage. Accordingly, it is an object of my invention to provide an improved fitting for fluid circulating systems for connecting a single fluid circuit to any one of a plurality of fluid circuits.

Another object of my invention is to provide a fitting for connecting a single fluid circuit to any one of a plurality of fluid circuits, which shall be of simple construction, easy to manipulate and effectively sealed against leakage.

Further objects and advantages of my invention will become apparent as the following description proceeds, and the features of novelty which characterize my invention will be pointed out with particularity in the claims annexed to and forming a part of this specification.

For a better understanding of my invention, reference may be had to the accompanying drawing in which Fig. 1 shows a fitting embodying my invention arranged in the circuit of a house heating and cooling system; Fig. 2 is an enlarged plan view of the fitting shown in Fig. 1; Fig. 3 is a sectional view on the line 3—3 of Fig. 2; Fig. 4 is a sectional view on the line 4—4 of Fig. 3; and Figs. 5 and 6 are reduced size sectional views on the line 5—5 of Fig. 3.

Referring now to Fig. 1, I have shown a plurality of radiators 10 of a house heating and cooling system provided with a fitting 11 embodying my invention. The radiators 10 are connected to the fitting 11 by supply and return conduits 12 and 13, respectively, and are provided with inlet valves 10a. The fitting 11 is connected to heating fluid supply and return conduits 14 and 15, respectively, and to cooling fluid supply and return conduits 16 and 17, respectively. The conduits 14 and 15 may be connected to any suitable source of heating fluid such as a hot water heater 8, and the conduits 16 and 17 may be connected to any suitable source of cooling fluid such as the brine circuit of a refrigerating system 9. The fitting 11 is arranged so that when it is desired to change the radiators 10 from heating elements to cooling elements a plate within the fitting may be loosened and rotated to change the circuits so that the radiator supply and return conduits 12 and 13 are connected to the cooling supply and return conduits 16 and 17 instead of to the heating supply and return conduits 14 and 15.

The construction of the fitting 11 is clearly shown in Figs. 2, 3, and 4. The fitting comprises a body having an upper member 18 and a lower member 19. The member 18 is provided with a pair of outlet and inlet connections 20 and 21, respectively, and the member 19 is provided with two pairs of inlet and outlet connections; one pair comprising an inlet 22 and an outlet 23, the other pair comprising an inlet 24 and an outlet 25. The member 18 is provided with two passageways 26 and 27; passageway 26 being arranged in communication with the outlet connection 20 and having branches 28 and 29 directly above the inlet connections 22 and 24, respectively, in the member 19. The passage 27 is arranged in communication with the inlet connection 21 and is provided with branch passages directly above the outlet connections 23 and 25; the passage above the outlet 25 being indicated at 30 in Fig. 4.

In order to connect either of the pairs of inlet and outlet connections in the body 19 to the pair of inlet and outlet connections 21 and 20 in the body 18, I provide a movable plate 31 mounted between the members 18 and 19 and having gaskets 32 and 33 on either side thereof to seal the joints between the plate and the members 18 and 19, respectively. The members 18 and 19 are clamped together securely against the plate 31 and gaskets 32 and 33 by a bolt passing through the members 18 and 19 and having a head 35 welded to the member 19 as indicated at 36. The bolt 34 is provided with a nut 37 fitting a threaded portion 38 of the bolt extending outside the member 18. The nut 37 is provided with a handle 39 in order that it may easily be loosened or tightened as desired. The plate 31 is rotatably mounted on the bolt 34, as clearly shown in Figs. 5 and 6, and is provided with diametrically opposite openings 40 and 41. When the fitting 11 is arranged as shown in Fig. 1, the connections 20 and 21 are connected to the radiator supply conduits 12 and 13, respectively; the connections 22 and 23 are connected to the heating supply conduits 14 and 15, respectively; and the connections 24 and 25 are connected to the cooling supply conduits 16 and 17, respectively. In Fig. 5, the plate 31 is shown in the heating position and connects the inlet 22 and outlet 23 to the outlet and inlet 20 and 21, respectively, and in Fig. 6, the plate 31 is shown in the cooling position and connects the inlet 24 and the outlet 25 to the outlet and inlet 20 and 21, respectively. Portions of the plate 31 extend from the edge thereof to provide a plurality of tabs 42. These tabs projecting beyond the edge of the plate constitute handles or grips and are provided in order that the plate may be turned easily when it is loosened. The gaskets 32 and 33 are of the same shape as the plate 31 and have openings registering with the openings 40 and 41. When it is desired to change the position of the plate 31, the nut 37 is loosened by turning the handle 39 and the plate and gaskets are turned 90°, so that the openings 40 and 41 connect a different set of supply and return conduits to the radiator conduits 12 and 13.

During the operation of the heating and cooling system just described, when the plate 31 is clamped in the position shown in Fig. 5, heating fluid is admitted to the fitting 11 from the supply conduit 14, flows through the inlet 22, the opening 40 and the branch 28 of the passage 26 and thence out through the connection 20 and the supply conduit 12 to the radiators 10. After flowing through the radiators, the heating fluid passes to the return conduit 13 and into the fitting 11 through connection 21, passage 27, opening 41, and outlet connection 23 to the return conduit 15 and thence back to the heater 8. When it is desired to change from winter to summer operation, the nut 37 is loosened by turning the handle 39 and the plate 31 is then rotated by pressing on lugs 42 until it is in the position shown in Fig. 6. With the plate 31 in the position shown in Fig. 6, the cooling fluid is admitted to the fitting 11 from the supply conduit 16, flows through the connection 24, branch 29 of passage 26, and through connection 20 and supply conduit 12 to the radiators 10. The spent cooling fluid flows from the radiators 10 to the conduit 13, and through the connection 20 and passage 27 to the fitting 11 and out of the fitting through opening 41 in the plate 31 and outlet connection 25 and thence to return conduit 17, and back to the cooling system 9.

It is readily apparent that when the nut 37 is tightened on the bolt 34 to clamp the members 18 and 19 against the plate 31, the gaskets seal the entire fitting both at the edges and around the bolt 34. All leaks are prevented and there are no moving parts which require packing. I have, therefore, provided a fitting for fluid circulating systems which is of simple and rugged construction and may be adjusted easily to change the arrangement of the fluid circuits. Furthermore, there is a minimum possibility of leakage from the fitting.

While I have described my invention in connection with a house heating and cooling system, other applications will readily be apparent to those skilled in the art. I, therefore, do not desire my invention to be limited to the embodiment shown and described, and I intend in the appended claims to cover all modifications within the spirit and scope of my invention.

What I claim as new and desire to secure by Letters Patent of the United States is:

1. A fitting for fluid circulating or distributing systems comprising a body having two members, one of said members having a single pair of inlet and outlet connections, the other of said members having a plurality of pairs of inlet and outlet connections, means including a movable plate having openings therein and arranged between said members for placing said single pair of connections in communication with any one of said plurality of pairs of connections, and means for clamping said members together to prevent movement of said plate.

2. A fitting for fluid circulating or distributing systems comprising a body having two members, one of said members having a single pair of inlet and outlet connections, the other of said members having a plurality of pairs of inlet and outlet connections, means including a movable plate having openings therein and arranged between said members for placing said single pair of connections in communication with any one of said plurality of pairs of connections, the edges of said plate extending to the outer edges of said members, and means for clamping said members together to prevent movement of said plate and to seal the surfaces of contact between said plate and said members.

3. A fitting for fluid circulating or distributing systems comprising a body having two members, one of said members having a single pair of inlet and outlet connections, the other of said members having a plurality of pairs of inlet and outlet connections, means including a movable plate having openings therein and arranged between said members for placing said single pair of connections in communication with any one of said plurality of pairs of connections, sealing gaskets on either side of said plate between said plate and said members, and means including a threaded bolt extending through said members and said plate for clamping said members and plate together against said gaskets to prevent movement of said plate and to seal said fitting.

4. A fitting for fluid circulating or distributing systems comprising a body having two members, one of said members having a single pair of inlet and outlet connections, the other of said members having a plurality of pairs of inlet and outlet connections, means including a movable plate having openings therein and arranged between said members for placing said single pair of connections in communication with any one of said plurality of pairs of connections, and a single bolt extending through said members and said plate for clamping said members together to prevent movement of said plate.

WILLIAM DALTON.